(12) United States Patent
Henniger et al.

(10) Patent No.: US 7,111,160 B1
(45) Date of Patent: Sep. 19, 2006

(54) METHOD AND APPARATUS FOR USING A DEVELOPMENT PORT FOR BOOT UP

(75) Inventors: Mick Henniger, Austin, TX (US); Kelvin Shih-Tai Liu, Culpertino, CA (US); Ming Chi Chen, Union City, CA (US); Ramesh Srinivasan, Santa Clara, CA (US); Severin Baer, Cupertino, CA (US); Sanjoy Dey, Fremont, CA (US); Smita Kiran Rane, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/499,598

(22) Filed: Feb. 7, 2000

(51) Int. Cl.
*G06F 9/44* (2006.01)
*G06F 15/16* (2006.01)

(52) U.S. Cl. ............... 713/2; 713/200; 709/200

(58) Field of Classification Search ............ 713/2, 713/201, 400; 714/25, 30, 12; 710/302; 370/395.1; 361/724, 725; 709/200
See application file for complete search history.

(56) References Cited

U.S. PATENT DOCUMENTS 5,878,248 A * 3/1999 Tehranian et al. .......... 709/200
6,003,130 A * 12/1999 Anderson .................. 713/2
6,105,136 A * 8/2000 Cromer et al. .............. 713/201
6,161,177 A * 12/2000 Anderson .................. 713/2
6,449,732 B1 * 9/2002 Rasmussen et al. .......... 714/12

OTHER PUBLICATIONS

Applied Microsystems Corporation; Emulator Installation Guide; Code TAP® for the Motorola® MPC8XX; Apr. 1997; cover sheet, Chapter 1—Overview, pp. 1-7 through 1-8 and Chapter 4—Connecting to the Target, pp. 4-1 through 4-11.
Motorola MPC860 User's Manual; Figure 1-1.MPC860 Block Diagram, Section 4—Reset pp. 4-1 through 4-11 and Support Development pp. 18-20 through 18-40.

* cited by examiner

*Primary Examiner*—Jeffrey Gaffin
*Assistant Examiner*—Hassan Mahmoudi
(74) *Attorney, Agent, or Firm*—Campbell Stephenson Ascolese LLP

(57) ABSTRACT

The development port or Debug port of a microprocessor on an intelligent daughterboard is used for downloading code or configuration information from a motherboard for use in boot-up. In various aspects, the code or configuration information can include information used for configuring a port, other than the development port, and/or for configuring a memory controller, such as for a daughterboard DRAM. Use of the Debug port makes it possible to reduce or eliminate the need for storing boot-up code or configuration information on a daughterboard ROM, or other non-volatile memory, thus reducing cost and space requirements, power consumption and the like.

14 Claims, 4 Drawing Sheets

METHOD AND APPARATUS FOR USING A DEVELOPMENT PORT FOR BOOT UP

The present invention is related to employing a development port of a microprocessor for boot procedures and in particular to reduce or avoid the need for relying on a read only memory (ROM) or similar device for boot up.

BACKGROUND INFORMATION

It is common for microprocessor-based electronic equipment to include two or more interconnected printed circuit boards, often including a main circuit board having the main controller or microprocessor (often termed the "motherboard") and one or more connected "daughterboards". In many electronic devices, some or all of the daughterboards, may, themselves, be "intelligent", i.e., may have their own programmable controllers, typically microprocessors.

When electronic devices of these types are operated, upon initial power-up (or, in some cases, upon resetting the microprocessors) some or all devices on the boards need to access and/or execute certain microcode or other code or configuration information. Some or all of this code or information may include what is commonly called "boot-up code". Because such boot-up code must be available, (e.g. upon power-up), it is often stored in a read only memory (ROM) device mounted on the same board where the microprocessor is mounted. Although ROM components are commonly provided for this purpose, it is, at least theoretically, possible to use any type of non-volatile memory, such as flash memory, SRAM and the like.

In many situations, providing or mounting a separate ROM (or other non-volatile memory) component on an intelligent daughterboard is a non-optimal approach to providing boot-up code. The mounting of a ROM component on a daughterboard occupies surface area on the board which is often needed for accommodating other components or circuitry (particularly since many daughterboards have relatively small surface area). Furthermore, the ROM components themselves undesirably add to the cost of the daughterboard and the cost of mounting such ROM devices undesirably adds to the cost of board fabrication. ROM devices undesirably consume power. Furthermore, ROM devices and similar memory devices may be cumbersome or impossible to reprogram, e.g., to accommodate upgrades and the like. Accordingly, it would be useful to provide a system, method and apparatus for use in booting up an intelligent daughterboard while eliminating or reducing the need for mounting a ROM or other nonvolatile memory on the daughterboard.

Cost is often a consideration in designing and implementing electronic devices and, although there are advantages (noted above) to avoiding the need for mounting nonvolatile memory on a daughterboard, the cost for such an approach can be a significant issue. Accordingly, it would be useful to provide a system, method and apparatus to reduce or avoid the need for mounting nonvolatile memory on an intelligent daughterboard in which at least some of the components or features involved are components and features which are already present, e.g. for another purpose.

SUMMARY OF THE INVENTION

The present invention includes the recognition of the existence, nature and/or source of problems in previous approaches, including as described herein. According to one aspect, the development port of a daughterboard microprocessor (which is a port that is normally inactive or not used during power-up, boot-up, reset or during normal operation) is used to facilitate one or more of the boot-up procedures, such as accessing or storing boot-up code, configuration information and the like, originating on (or received from) the motherboard (or other component of the electronic device). In one embodiment, the development port is used only for downloading or accessing the minimum amount of boot code (or the like) needed or useful for initially booting or configuring the daughterboard components. In one embodiment, initial code downloaded, via the development port, includes code as needed for configuring a memory controller and/or other devices permitting operation of a DRAM. Thereafter, additional operating system or other code is imported into daughterboard memory via more conventional routes. In another embodiment, the development port is used for downloading, onto the daughterboard, some or all of the operating system (or the so-called "image") used for normal operation of the daughterboard.

DETAILED DESCRIPTION OF THE PREFERRED EMBODIMENT

Figure 1C:
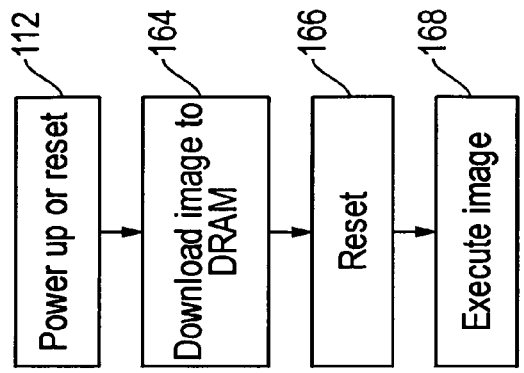
FIGS. 1C, and 1F are a flow diagram and a block diagram, respectively, depicting procedures and components for boot-up with respect to an intelligent daughter card according to one previous approach.

Before describing aspects of the present invention, certain previously-used approaches will be described. As depicted in FIGS. 1A and 1D, according to at least some previous approaches, upon power up (or reset) of an electronic device 112, an intelligent daughterboard 114 (i.e. having a microprocessor or similar controller 116), which is coupled to a motherboard 118 (typically via an edge connector 122) will have a microprocessor 116 which receives boot code 124 from a non-volatile memory such as a ROM 126 mounted on the daughterboard. In a typical situation, the daughterboard processor 116 includes a serial or other port 128 coupled to a bus 132. However, in typical previous devices, it is necessary to use the boot code 124 to configure the serial port 128 before receiving information from the motherboard 118 over the bus 132. For this reason, in the configuration depicted in FIG. 1D, it is impossible to download the boot code 124 from the motherboard 118 over the bus 132, since the daughterboard 128 cannot be configured until after the boot code 124 has been accessed. As noted above, the need for providing a nonvolatile memory 1.26 mounted on the daughterboard 114 undesirably increases costs, occupies board surface area, consumes power, and may make it cumbersome or impossible to provide programming upgrades.

After the boot code 124 is provided from the ROM 126, the port 128 can be configured thus permitting the operating system or "image" to be loaded 134 (FIG. 1A), typically from the ROM 126 (FIG. 1D)(e.g. a PROM or from a flash memory). As described below, in other configurations, the image can be downloaded through the interface between the host and the daughtercard. Thereafter, the microprocessor 116 can be reset and the operating system or image can execute 136 (FIG. 1A).

Figure 1B:
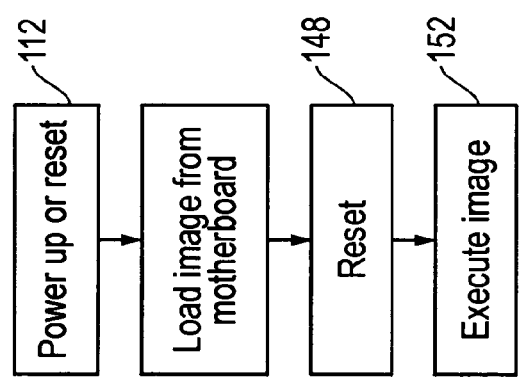
FIGS. 1B and 1E are a flow diagram and a block diagram, respectively, depicting procedures and components for boot-up with respect to an intelligent daughter card according to one previous approach.
Figure 1A:
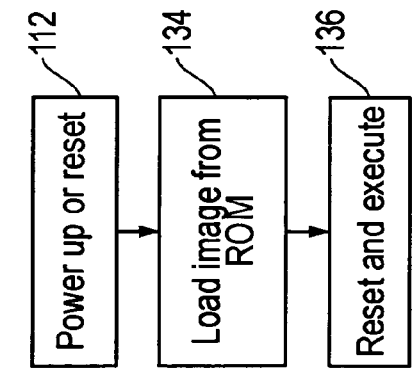
FIGS. 1A and 1D are a flow diagram and a block diagram, respectively, depicting procedures and components for boot-up with respect to an intelligent daughter card according to one previous approach.
Figure 1F:
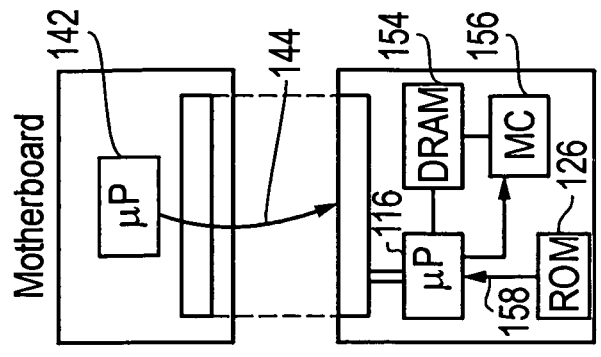
Figure 1E:
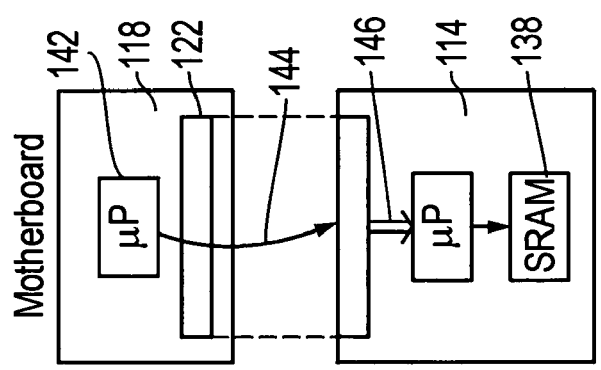
Figure 1D:
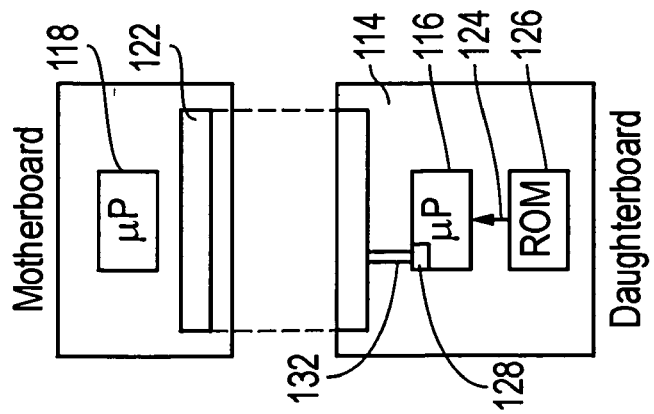

In the approach of FIGS. 1B and 1E, a daughterboard which contains a memory other than (or in addition to) a dynamic random access memory (DRAM) storage device, such as a static random access memory device (SRAM) 138. In the approach of FIG. 1B, following power up or reset 112 the processor 142 (FIG. 1E) on the motherboard (or "host") 118 provides firmware or microcode image for downloading 144, e.g., via a serial or other bus 146 to the non-DRAM storage device 138 on the daughter card 114 (via an interface between the host and the card). Following the image download, the processor on the daughter card 114 is reset 148 (FIG. 1B), after which it executes the image 152.

Unfortunately, the configuration depicted in FIGS. 1B and 1E is not feasible when the target device on the daughter card (for storing the image) is DRAM 154 (as depicted in FIG. 1F). In the approach depicted in FIGS. 1C and 1F, the DRAM 154, for proper operation, needs to be coupled to or controlled by a memory controller 156 (FIG. 1F) (e.g. to provide it with timing information and the like). A memory controller 156 can be provided externally in hardware (e.g. using a programmable logic device or a field programmable gate array or the like) or, in some cases, may be built-in as part of the microprocessor 116. In either case, however, the memory controller 156 must be typically configured before it can control the DRAM 154. Accordingly, in the configuration of FIGS. 1C and 1F, upon power up or reset 112 (FIG. 1C), microcode or configuration information 158 (FIG. 1F) is provided to (or accessed by) the microprocessor 116 from a ROM 126 (or other nonvolatile memory) and then provided 162 to the memory controller 156. Thus, in the embodiment of FIG. 1C, a ROM 126 is used, increasing cost, occupying surface area, consuming power and making it impossible or cumbersome to provide updates. In the approach of FIGS. 1C and 1F, after the memory controller has been configured, the image or operating system can be downloaded, e.g. from the motherboard 144 for storage 164 in the DRAM 154. Thereafter, the microprocessor 116 is reset 166 (FIG. 1C) and the image stored in the DRAM 154 is executed 168.

Thus, as can be seen from FIGS. 1A through F, in the depicted previous approaches, it was typically necessary to provide some type of non-DRAM, typically non-volatile, memory component or device 126 (FIGS. 1D and F), 138 (FIG. 1E) (such as a PROM or an SRAM) on the daughterboard 114. SRAMs and similar devices are generally disadvantagous at least because of their relatively high cost, and power and space requirements.

One aspect of the present invention involves the recognition that a component or feature of many types of microprocessors which is provided for testing or debugging purposes, namely the development port (DP) (sometimes referred to as a "Debug port") can play a role in boot-up of an intelligent daughterboard, in particular, in such a way as to reduce or avoid the need for mounting a ROM component (or other non-volatile memory component) on the daughterboard.

Figure 2:
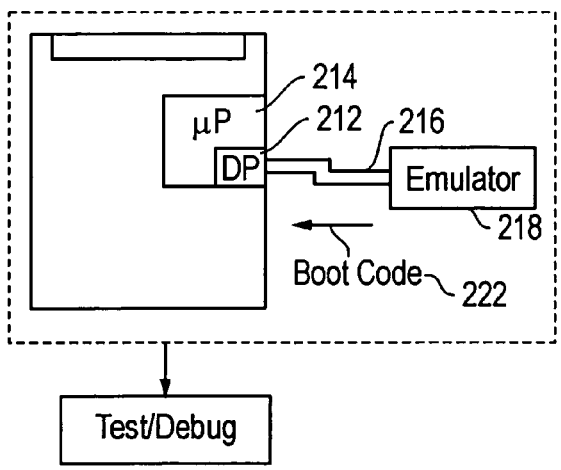
FIG. 2 is a block and flow diagram depicting components and procedures using a Debug port for testing or Debug purposes according to previous approaches.
Figure 4:
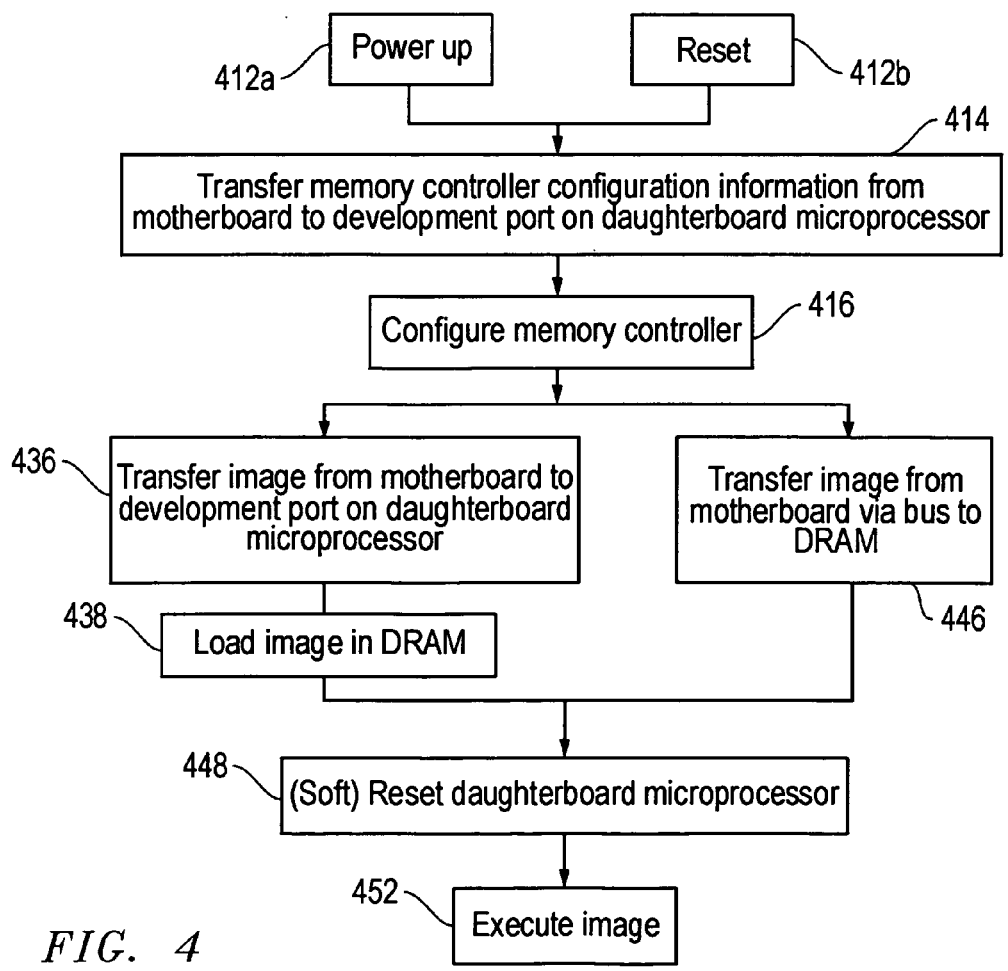
FIG. 4 is a flow chart depicting steps in a boot-up procedure of an intelligent daughterboard according to an embodiment of the present invention.

Many types of microprocessors provide a development port or debug port. One example is the development port provided in the Motorola MPC860 microprocessor and described, e.g., in MPC860 Power Quicc™ user's manual, especially at pages 4–1 through 4–12 and 18–22, 18–40, incorporated herein by reference. Regardless of what it may be called in other contexts, as used herein, a development port or Debug port of a microprocessor is a port which does not need configuration, following a power-up or (soft) reset, in order to load or receive data provided at the port. In the present context, a soft reset will cause the image to start executing at the reset vector in DRAM. In the example of the MPC860, the development port is a dedicated serial port which does not need any of the regular system interfaces. In the example of the MPC860, the development port provides a full duplex serial interface. The physical connections for using the development port in the MPC860 include a 10-pin connector. Typically, the development port of a microprocessor is inactive or not used during normal operation of the electronic device and also is typically inactive or not used during power-up or boot-up procedures in an electronic device. Instead, the development port is generally used during product design or development, testing, debugging and the like. In a typical use, a Debug port 212 (FIG. 2) of a microprocessor 214 is connected, via a ribbon connector, cable or the like, 216 to an external emulator device 218. An example of an external emulator device of a type that can be used in connection with the MPC860, for example, is that sold under the trade name Code TAP™, available from Applied Microsystems Corporation, and described, for example, in "Emulator Installation Guide, Code TAP for the Motorola MPC8XX", particularly pages 1–7, 21–8 and 4–124–11, incorporated herein by reference. An emulator 218 is typically used for testing the above unit, or other development purposes, and is typically not coupled to a Debug port during normal operation of an electronic device by an end user. When an emulator 218 is coupled to a Debug port 212, it is possible to use the emulator 218 to load data to the Debug port 212 and, if desired, it would be possible to use an emulator 218 to download boot code 222 to the Debug port 212.

One aspect of the present invention involves using the Debug port of a daughterboard microprocessor during normal use by an end user and, in particular during normal boot-up, such as following power-on or reset. As depicted in FIGS. 3A–C and 4, following power-up or reset 412*a,b*, (FIG. 4) initial boot-up code (or configuration information), which can, in at least one embodiment, include memory controller configuration information, is downloaded 314 (FIG. 3A) from a motherboard 316 to a coupled daughterboard 318 through the development port 322 of the daughterboard microprocessor 324. In the embodiment depicted in FIG. 3A, a bus (or other) communication line 326 is provided between the development port 322 and a connection or interface to the motherboard 316, e.g. through an edge connector 328*b*. In one embodiment, on the daughterboard 318, the bus 326 comprises a plurality of traces or leads formed on the surface of the printed circuit board 318 in a manner that will understood by those of skill in the art. With respect to the motherboard 316, in one embodiment, a serial peripheral device connection is used, at least during boot up, for providing a path to download information codes, configurations and the like stored on the motherboard (e.g. in a memory device mounted on or coupled to the motherboard).

Figure 3C:
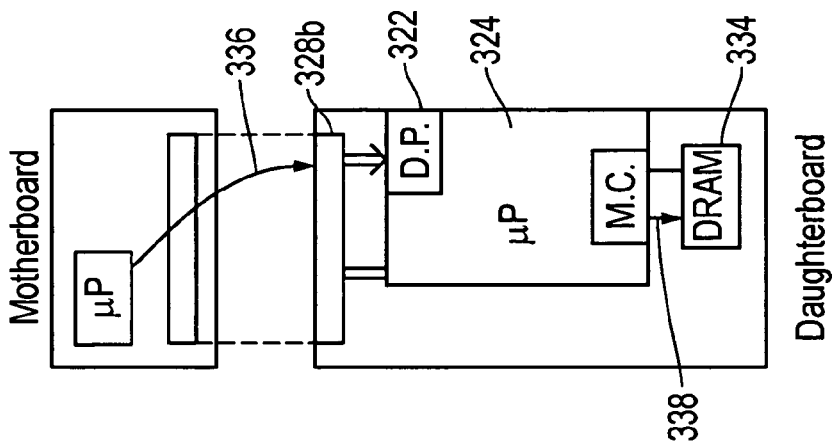
FIGS. 3A, B and C are block diagrams depicting procedures for daughterboard boot-up according to embodiments of the present invention.
Figure 3B:
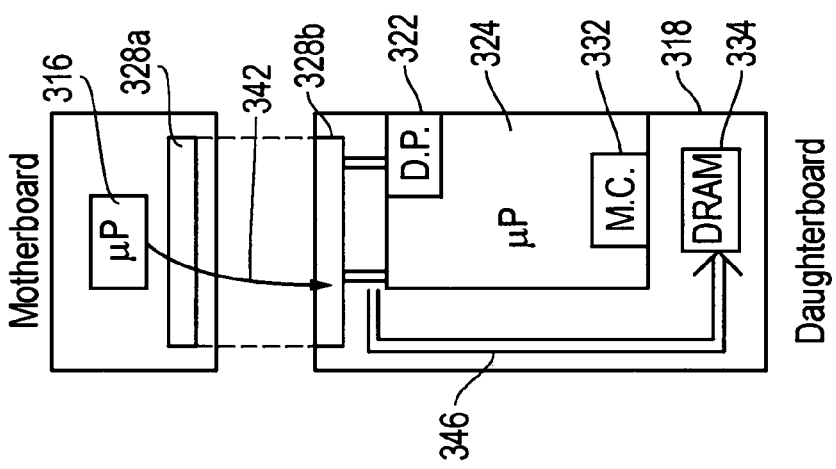
Figure 3A:
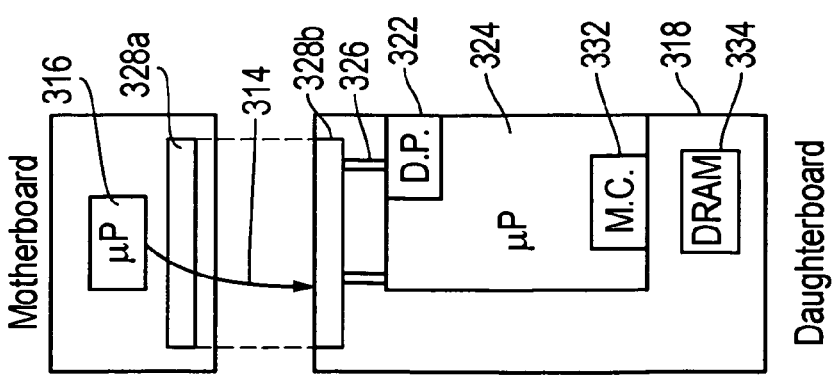

In the embodiment depicted in FIGS. 3A–C, the memory controller 332 is provided as a component of the microprocessor 324, although, as noted above, it is also possible to use the present invention in configurations in which a memory controller is provided as an external device. The information which was downloaded 414 is used to configure 416 the memory controller 322. Once the memory controller 332 has been configured, the DRAM 334 is, at least theoretically, operable. In one embodiment (FIG. 3C), following configuration of the memory controller 332, further coding or software, such as an operating system or "image" is downloaded 336 (step 436) through the development port 322 for transfer 338 to the DRAM 334. In another embodiment (FIG. 3B), image or other code can be transferred 342 from the motherboard and provided 446 to the DRAM 334 by using a system bus 346 i.e. without using the development port 322 for the transfer of the image or the operating system. In any case, after the operating system or image has been stored in the DRAM 334, the daughterboard microprocessor can be (soft) reset 448 and the image can be executed 452.

As can be seen from FIGS. 3A–C, use of the development port 322, as described, makes it possible to provide for configuration or boot up of an intelligent daughterboard in the absence of a need for using a ROM or other non-volatile memory mounted on the daughterboard. The depicted embodiments include a DRAM mounted on the daughterboard, but typically, a DRAM would be provided for use during non-boot up general operation of the daughterboard and accordingly does not represent an additional cost, consumption of power or surface area and the like (compared to the power, surface area and cost needed for non-boot-up operation). As noted above, a Debug port is commonly provided on microprocessors (for other purposes) and thus this component or feature used during embodiments of the present invention also is a component or feature which is already present for other purposes and thus is compatible with providing embodiments of the present invention without the need to design or provide additional components. In at least some embodiments, communication of code or data from the motherboard to the daughterboard development port is performed using the motherboard's serial peripheral device connection, coupling or pathway, also already present (on the motherboard) for another purpose, thus in assisting in avoiding the need for incurring additional design or component costs in order to implement embodiments of the present invention.

In light of the above description a number of advantages of the present invention can be seen. The present invention makes it feasible to achieve configuration and/or boot up of an intelligent daughterboard while reducing or eliminating the need for using and/or mounting a ROM or other non-volatile memory device on the daughterboard. The present invention accordingly can reduce the cost, consumption of surface area and/or consumption of power on the daughterboard, needed for boot up or configuration purposes, e.g. providing additional surface area which can be used mounting other circuitry or components. The present invention effectively makes use of one or more features or components which are provided or used for other purposes, thus making it possible to implement at least some embodiment of the present invention without undue requirements for adding additional components to an electronic device.

The number of variations and modifications of the invention can be used. It is possible to use some aspects of the invention without using others. It is possible to use the development port during daughterboard boot up without using it for configuring a memory controller. The present invention can be used in any of a plurality of different types or categories of electronic devices, including personal computers, work stations, network devices such as routers, switches, bridges, hubs and the like, telecommunications devices or components and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of booting up a system, wherein the system comprises a motherboard coupled to daughterboard, wherein the daughterboard comprises a microprocessor, a system bus, a random access memory that stores a copy of an operating system, and a second bus, wherein the microprocessor comprises a development port coupled to the second bus, wherein the microprocessor comprises a memory controller, wherein the memory controller is coupled to the random access memory via the system bus, the method comprising:

transmitting memory controller configuration information from said motherboard to said memory controller via the development port and the second bus, in response to a power-on or reset of said system; and the memory controller reading some or all of the operating system copy stored in the random access memory via the system bus after the memory controller receives the memory controller configuration information via the development port and in response to the power-on or reset of said system.

2. The method of claim 1 transmitting the copy of the operating system from the motherboard to the random access memory for storage therein.

3. The method of claim 1 wherein the development port comprises a full duplex serial interface.

4. The method of claim 1 further comprising transmitting the operating system copy from the motherboard to the random access memory for storage therein via the development port, after the memory controller receives the memory controller configuration information via the development port and in response to the power-on or reset of said system.

5. The method of claim 4 wherein the memory controller configuration information is transferred to the memory controller from a memory device on said motherboard.

6. An apparatus comprising:
a first printed circuit board;
a processor mounted to the first printed circuit board, wherein the processor comprises a development port and a memory controller;
a system bus formed on the first printed circuit board and coupled to the memory controller;
a second bus formed on the first printed circuit board and coupled to the development port;
a random access memory mounted on the first printed circuit board and coupled to the memory controller via the system bus, wherein the random access memory stores a copy of an operating system;
wherein the development port is configured to transfer configuration information to the memory controller;
wherein the memory controller is configured to read some or all of the operating system copy stored in the random access memory via the system bus after the memory controller receives the configuration information via the development port.

7. The apparatus of claim 6 further comprising:
a second printed circuit board;
a first data storage device mounted on the second printed circuit board, wherein the first data storage device stores the configuration information;
a coupler, coupling the first printed circuit board to the second printed circuit board, defining at least a first data communication path from said second printed circuit board to said first printed circuit board;
wherein the configuration information can be transmitted from the first storage device, over the first communication path, said second bus, to said development port of the processor.

8. The apparatus of claim 7 wherein the development port receives data from an emulator device external to the processor when the development port is coupled to the emulator device.

9. The apparatus of claim 7 wherein the development port is configured to transfer the configuration information automatically, in response to a power up or a reset of the apparatus.

10. The apparatus of claim 9 wherein the memory controller is configured to read some or all of the operating system copy stored in the random access memory after the memory controller receives the configuration information and in response to the power up or the reset of the apparatus.

11. The apparatus of claim 10 wherein the development port comprises a full duplex serial interface.

12. The apparatus of claim 6 wherein the second bus comprises a serial data bus.

13. An apparatus comprising:
a first printed circuit board coupled to a second printed circuit board;
a processor mounted to the first printed circuit board, wherein the processor comprises a development port and a memory controller;
a random access memory mounted on the first printed circuit board and configured to store a copy of an operating system;
a system bus formed on the first printed circuit board and coupled to the random access memory and the memory controller;
a second bus coupled to the development port, wherein the second bus is formed on the first printed circuit board;
means for downloading memory controller configuration information from said second printed circuit board to said memory controller via the development port and the second bus, in response to a power on or reset of said apparatus.

14. The apparatus of claim 13 wherein the development port receives data from an emulator device external to the processor when the development port is coupled to the emulator device.

* * * * *